UNITED STATES PATENT OFFICE.

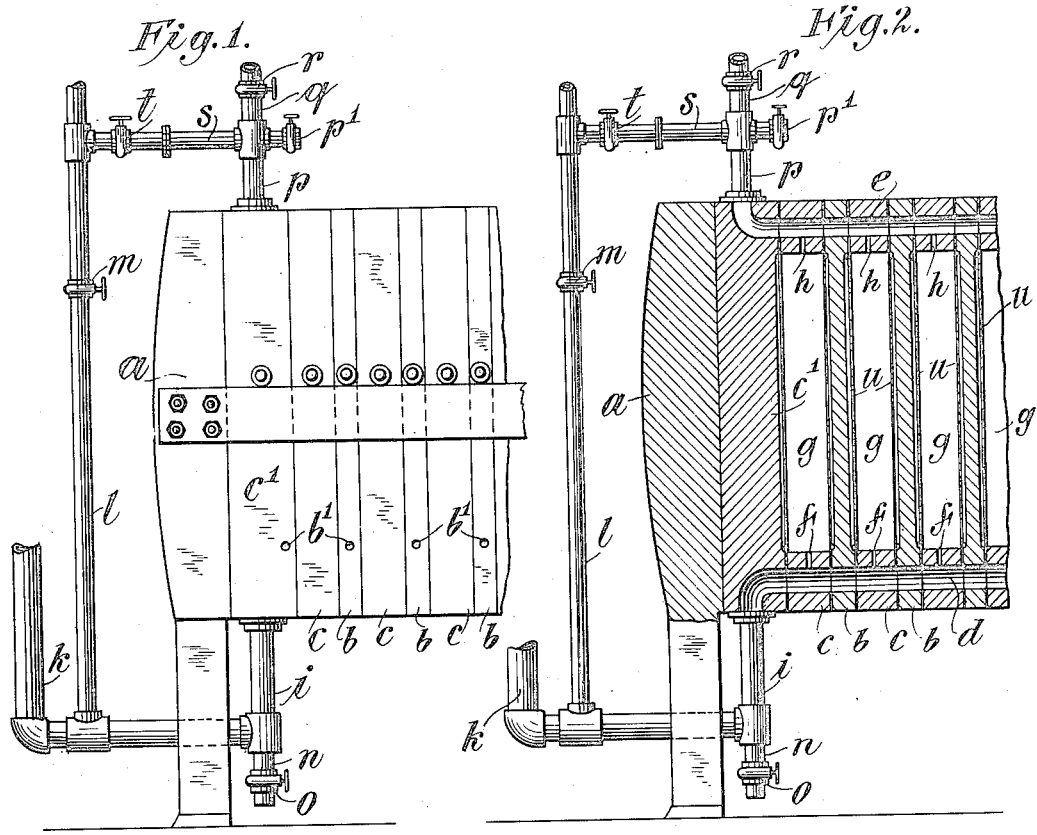
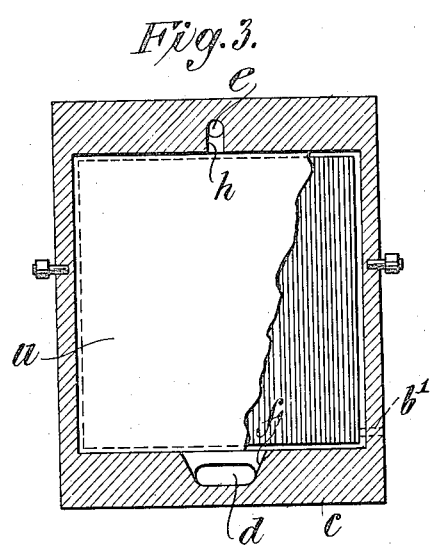
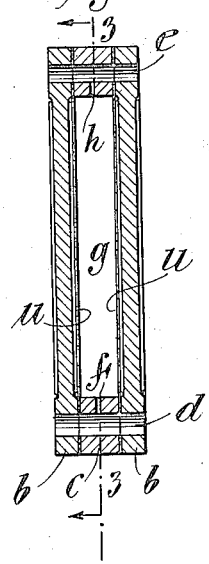
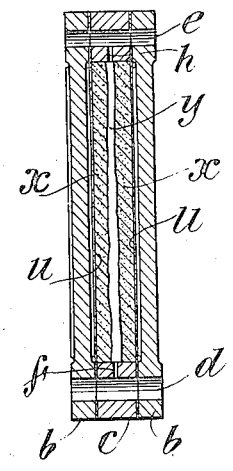

ALFRED BURGER, OF NEW BRIGHTON, NEW YORK.

FILTERING PROCESS.

1,164,065.        Specification of Letters Patent.        Patented Dec. 14, 1915.

Application filed May 25, 1912. Serial No. 699,751.

*To all whom it may concern:*

Be it known that I, ALFRED BURGER, a citizen of Switzerland, residing in New Brighton, Richmond county, State of New York, have invented certain new and useful Improvements in Filtering, of which the following is a specification, reference being had to the accompanying drawing, which forms a part hereof.

In carrying on the process of filtering with filter presses, in which the liquor to be filtered is forced into chambers lined with filter cloths and formed between separable filter plates, it is usual to continue the introduction of the liquid to be filtered until each chamber is practically filled with the solid matter which is filtered out from the liquor; and after the introduction of wash water and the driving out of the wash water, the filter press is opened to permit the removal of the filter cakes of solid matter. In some cases the filter cakes are disintegrated and washed out by jets or liquid introduced into the chambers without opening the filter press, suitable outlets and connections being provided. In all of the methods commonly used heretofore, whether the filter press is opened to permit the removal of the filter cakes or the filter cakes are washed out, the time required for the complete performance of the operation of filtering is considerable.

It is the object of this invention to reduce the time required for the operation and thus reduce the expense, especially in the filtering of a liquid which contains a large percentage of solid matter. This is accomplished by continuing the introduction of the material to be filtered until each filter chamber is filled in part only with a thick cake of solid matter on each side, a space being left between the two filter cakes which are then formed on the cloths at opposite sides of the chamber; then stopping the introduction of the material to be filtered; then introducing wash water into the space which is thus left between the two cakes, the wash water being forced through the cakes and cloths and carrying with it such soluble matter as remains in the cakes; then the wash water is forced out from the chamber by air pressure; finally the filter is opened and the cakes are removed in the usual way. By this method filtration is carried on very rapidly, the washing is also carried on rapidly, the driving out of the wash water is quickly effected, and the whole operation is completed in much less time than is necessary under the old methods.

The invention will be more fully explained hereinafter with reference to the accompanying drawing in which is illustrated so much of a filter press as is necessary to enable the invention to be understood.

In the drawing Figure 1 is a view in side elevation of a portion of a filter press which is substantially of ordinary construction but is fitted for the practice of the improved method. Fig. 2 is a view of the same partly in longitudinal section through the plates and frames of the filter press. Fig. 3 is a view in section on the plane indicated by the line 3—3 of Fig. 4, showing one of the frames in section with one of the plates beyond it, the filter cloth being broken away. Fig. 4 is a view in longitudinal central section showing one of the frames and the two adjacent plates and cloths with the empty chamber between. Fig. 5 is a view similar to Fig. 4 but showing the chamber partially filled with the filter cakes.

The filter press shown in the drawing is substantially of ordinary construction, comprising heads, one of which is shown at $a$, filter plates $b$, and frames $c$, the plates and frames being supported in the usual manner. The frames and plates are shown as provided with registering holes, as at $d$, to form a conduit for the introduction of the liquor to be filtered and the wash water, and with registering holes $e$ to form a conduit for the supply of air under pressure to drive out the wash water. Each frame $c$ is formed with an opening $f$ to establish communication between the conduit $d$ and the chamber $g$ which is formed between two adjacent plates $b$, and with an opening $h$ to establish communication between the conduit $e$ and the chamber $g$. A pipe $i$ is connected to the conduit $d$ through the end plate $c^1$ and is provided with a connection, as at $k$, to the tank or pump from which the liquor to be filtered is supplied and with a connection, as at $l$, to the source of wash water, the latter being provided with a suitable valve $m$. A discharge pipe $n$, provided with a valve $o$ is also connected to the pipe $i$. In like manner a pipe $p$ is connected to the conduit $e$ from the end plate $c'$ and may be connected through a pipe $q$, provided with a valve $r$, to a source of air under pressure. The pipe *p* may also be connected through a pipe *s* provided with a valve *t* to the water supply. Each plate *b* is provided with a hole *b'* through which the filtered liquid may be discharged into a trough not shown.

In practising the improved method with the apparatus shown in the drawing the liquor to be filtered is forced into the chambers *g* through the pipes *k* and *i*, the conduit *d* and the openings *f*. The filtered liquid passes through the cloths *u* down the corrugations of the plates *b* and out through the holes *b'* in the usual manner. The solid matter gradually collects on the cloths *u*, forming, as is well understood, vertical cakes indicated at *x*. The introduction of the liquor to be filtered is continued until the chamber *g* is partially filled, but is stopped when there is still a space *y* between the opposing faces of the two filter cakes *x* in each chamber *g*. Then wash water is admitted directly into the spaces *y* through the conduit *d* from the pipe *l*, thereby forcing the liquid which remains in such spaces through the cakes, the water itself finally passing through the filter cakes and washing from them such of the filterable liquid as remains in them. When the washing has been carried on as long as may be desired, the supply of wash water is cut off and air under pressure is admitted through the pipe *q* to force the wash water which remains in the spaces *y* back through the conduit *d* and out through the discharge pipe *n*, pressure being maintained continuously throughout the introduction of the liquid to be filtered, the introduction of wash water and the forcing out of the wash water. Finally the supply of air under pressure is shut off and the filter is opened so as to permit the removal of the filter cakes in the usual manner. It is important that the wash water employed shall carry no insoluble particles since, in order to accomplish a thorough washing and a thorough removal of moisture after washing, with harder and more solid cakes, easier to handle, the space between the filter cakes must not be filled up and the surface of each cake must not be filled or coated with any deposit, in order that the air which is admitted after the wash water may penetrate every part of each cake and drive out the contained moisture. It will be understood that the valves on the separate pipes are manipulated so as to permit the several steps to be carried on as described. When the operation is begun, the valve *p'* may be opened so as to permit the escape of the air which is displaced by the liquor which is being forced into the chambers, the valve being closed when the air has been expelled. The valves *m* and *o* are closed when the liquor which remains in the spaces *y* is being forced back to its supply and the valve *o* is open when the wash water is being expelled; the valve *m* is opened when the wash water is to be admitted to the filter chambers from below, the valve *o* being then closed. If it is desired to admit the wash water from the top, the valve *m* is closed and the valve *t* is opened. The valve *r* is opened to admit the air under pressure and is closed at other times. The several valves are manipulated in a manner which will be readily understood by those skilled in the art so as to permit the several operations to be performed as desired.

It will be understood that the construction of the filter press and the means for controlling the operation of filtering may be varied to suit different conditions and that the invention is not dependent upon any particular form of apparatus.

I claim as my invention:—

The method of filtering in filter presses which consists in introducing the liquor to be filtered into the filter chamber, stopping the supply of liquor to be filtered when the chamber is partially filled with insoluble material and a space remains between the faces of the opposed filter cakes, introducing wash water free from insoluble matter into the space between the filter cakes and forcing it through the filter cakes, introducing air under pressure into the space between the filter cakes to expel the wash water, opening the filter chamber and removing the filter cakes as separate cakes.

This specification signed and witnessed this 20th day of May A. D., 1912.

ALFRED BURGER.

Signed in the presence of—
W. B. GREELEY,
AMBROSE L. O'SHEA.